US008489018B2

(12) United States Patent
Irvine et al.

(10) Patent No.: US 8,489,018 B2
(45) Date of Patent: Jul. 16, 2013

(54) TRANSMIT FREQUENCY PRECORRECTION FOR SATELLITE TERMINALS (75) Inventors: David Irvine, Carlsbad, CA (US);
Timothy J. Martin, Carlsbad, CA (US);
Mark J. Miller, Vista, CA (US)

(73) Assignee: ViaSat, Inc., Carlsbad, CA (US)

(*) Notice: Subject to any disclaimer, the term of this patent is extended or adjusted under 35 U.S.C. 154(b) by 386 days.

(21) Appl. No.: 12/831,942

(22) Filed: Jul. 7, 2010

(65) Prior Publication Data
US 2011/0009054 A1 Jan. 13, 2011

Related U.S. Application Data (60) Provisional application No. 61/224,439, filed on Jul. 9, 2009.

(51) Int. Cl.
*H04B 7/185* (2006.01)
(52) U.S. Cl.
USPC .......................... 455/12.1; 455/427; 370/316
(58) Field of Classification Search
USPC ............. 455/12.1–13.3, 62, 71, 75, 427–430; 370/316
See application file for complete search history.

(56) References Cited

U.S. PATENT DOCUMENTS

| 6,356,740 B1 * | 3/2002 | Malcolm et al. ................ 455/71 |
| 2009/0195444 A1 | 8/2009 | Miller | |

FOREIGN PATENT DOCUMENTS

| EP | 1030464 A1 | 8/2000 |
| EP | 1396948 A2 | 3/2004 |
| WO | 01/17110 A1 | 3/2001 |

OTHER PUBLICATIONS

European Search Report for European Application No. 10169105.3, mailed on Jul. 27, 2012, 7 pages.

* cited by examiner

*Primary Examiner* — Raymond Dean
(74) *Attorney, Agent, or Firm* — Kilpatrick Townsend & Stockton LLP (57) ABSTRACT

A method for determining a frequency correction and a symbol rate correction for transmissions from a user terminal in a satellite communications system comprises determining a frequency of a signal received at the user terminal, and determining a symbol rate of the signal received at the user terminal. The method also comprises computing an error associated with an oscillator at an outdoor unit of the user terminal, and computing an error associated with an oscillator at an indoor unit of the user terminal. The method also comprises computing a transmit frequency correction for the user terminal based on the error of the oscillator at the outdoor unit and the error of the oscillator at the indoor unit, and computing a transmit symbol rate correction for the user terminal based on the error of the oscillator at the indoor unit.

19 Claims, 8 Drawing Sheets

10 MHz Oscillator    Model of 10 MHz Oscillator

TRANSMIT FREQUENCY PRECORRECTION FOR SATELLITE TERMINALS

CROSS-REFERENCES TO RELATED APPLICATIONS

The present application claims benefit of priority under 35 U.S.C. 119(e) of U.S. Provisional Application No. 61/224,439, filed Jul. 9, 2009, entitled "Transmit Frequency Precorrection for Satellite Terminals," the content of which is incorporated herein by reference in its entirety.

FIELD OF THE INVENTION

The present invention relates generally to satellite communications systems. More particularly, the present invention relates to methods and systems for reducing frequency and timing errors in satellite communications systems.

BACKGROUND

Satellite communications systems transmit content over large geographic regions. In a typical satellite communications system, end users interface with the system through user terminals. The user terminals communicate, via one or more satellites, with one or more gateway terminals. The gateway terminals may process and route data to and from one or more networks according to various protocols.

A typical hub-spoke spot beam satellite communications system may include a non-processing "bent pipe" spot beam satellite, many user terminals, and a smaller number of gateway terminals. Each user terminal may be connected to a network, such as the internet, via a series of communication links.

A forward link of a satellite communications system may consist of forward uplink transmissions from a gateway terminal to a satellite, a "bent pipe" repeater at the satellite, and forward downlink transmissions to a group of user terminals located in a common spot beam. The forward link may carry data from a gateway terminal to many different user terminals. The forward link may utilize, for example, time Division Multiplexing (TDM) and/or Frequency Division Multiplexing (FDM) of data into RF transmissions.

A return link of a satellite communications system may consist of return uplink transmissions from user terminals in a common spot beam to a satellite, and return downlink transmissions from the satellite to a gateway terminal servicing the spot beam. Transmissions from many user terminals may utilize the return link using Time Division Multiple Access (TDMA), Frequency Division Multiple Access (FDMA), Code Division Multiple Access (CDMA), or the like.

In a typical satellite communications system, imperfections or differences between oscillators at the gateway, the satellite, and the user terminals can lead to frequency and timing errors. These errors may cause differences between actual and expected frequencies and symbol rates. As a result of the frequency errors, burst acquisition in a conventional satellite communications system may include a search over frequency. A substantial portion of signal processing design may be driven by frequency uncertainty, and a substantial portion of the processing resources may be used to accommodate the frequency uncertainty and estimate the frequency error. These errors also increase overhead, since ambles may need to be significantly longer to allow effective frequency estimation.

Reducing the frequency and timing errors can simplify system design and minimize overhead. Reducing the frequency error may eliminate the need for a frequency search prior to decoding transmitted data. This can improve efficiency by reducing system hardware requirements and increasing the number of bursts per second that can be processed.

Thus, there is a need in the art for methods and systems that reduce frequency and timing errors in satellite communications systems.

SUMMARY

The present invention provides reduced frequency and/or timing errors in satellite communications systems. For example, some embodiments of the present invention use a gateway oscillator as a reference for other oscillators in the system. Using the gateway oscillator as a reference, frequency and symbol rate errors at the user terminals can be determined, and transmitted frequencies and symbol rates can be adjusted to compensate for the errors. A tracking loop can also be used at the gateway to measure received frequencies and symbol rates of return link transmissions. The tracking loop can determine satellite oscillator and Doppler-induced errors, and adjust the received frequencies and symbol rates to compensate for these errors. Such embodiments can reduce frequency and timing errors in the satellite communications systems. This can improve system performance and reduce system hardware requirements.

In accordance with an embodiment of the invention, a method for determining a frequency correction and a symbol rate correction for transmissions from a user terminal in a satellite communications system comprises determining a frequency of a signal received at the user terminal, where the signal is transmitted from a gateway to the user terminal via a satellite in the satellite communications system, and determining a symbol rate of the signal received at the user terminal. The method also comprises computing an error associated with an oscillator at an outdoor unit of the user terminal based at least in part on the frequency of the signal received at the user terminal, and computing an error associated with an oscillator at an indoor unit of the user terminal based at least in part on the frequency of the signal received at the user terminal. The method also comprises computing a transmit frequency correction for the user terminal based at least in part on the error of the oscillator at the outdoor unit and the error of the oscillator at the indoor unit, and computing a transmit symbol rate correction for the user terminal based at least in part on the error of the oscillator at the indoor unit.

In accordance with another embodiment of the invention, a method for determining a correction for transmissions received at a gateway in a satellite communications system comprises determining a frequency of a signal received at the gateway, where the signal is transmitted from a user terminal to the gateway via a satellite in the satellite communications system. The method also comprises computing an error associated with an oscillator at a satellite in the satellite communications system, and computing an error associated with motion of the satellite. The method also comprises computing a receive frequency correction for the gateway based at least in part on the error associated with the oscillator at the satellite and the error associated with motion of the satellite.

In accordance with another embodiment of the invention, a system for determining frequency corrections and symbol rate corrections for transmissions in a satellite communications system comprises a gateway, a satellite communicatively coupled to the gateway, and at least one user terminal communicatively coupled to the satellite. Each user terminal may be configured to determine a frequency of a signal received at the user terminal, where the signal received at the user terminal is transmitted from the gateway to the user terminal via the satellite, and determine a symbol rate of the signal received at the user terminal. Each user terminal may also be configured to compute an error associated with an oscillator at an outdoor unit of the user terminal based at least in part on the frequency of the signal received at the user terminal, and compute an error associated with an oscillator at an indoor unit of the user terminal based at least in part on the frequency of the signal received at the user terminal. Each user terminal may also be configured to compute a transmit frequency correction for the user terminal based at least in part on the error of the oscillator at the outdoor unit and the error of the oscillator at the indoor unit, and compute a transmit symbol rate correction for the user terminal based at least in part on the error of the oscillator at the indoor unit. The gateway may be configured to determine a frequency of a signal received at the gateway, where the signal received at the gateway is transmitted from the user terminal to the gateway via the satellite. The gateway may also be configured to compute an error associated with an oscillator at the satellite, and compute an error associated with motion of the satellite. The gateway may also be configured to compute a receive frequency correction for the gateway based at least in part on the error associated with the oscillator at the satellite and the error associated with motion of the satellite.

Numerous benefits are achieved using the present invention over conventional techniques. For example, some embodiments provide methods for reducing frequency and symbol rate errors in satellite communications systems. This can free signal processing resources so that the number of bursts per second can be increased and the system hardware requirements can be reduced. This can also reduce overhead by requiring fewer amble symbols per burst. Depending upon the embodiment, one or more of these benefits may exist. These and other benefits are described throughout the specification and more particularly below.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same reference label irrespective of the second reference label.

DETAILED DESCRIPTION

The present invention provides methods and systems for reducing frequency and/or timing errors in a satellite communications system. As an example, some embodiments of the present invention use a gateway oscillator as a reference for other oscillators in the system. Using the gateway oscillator as a reference, frequency and symbol rate errors at the user terminals can be determined. Once these errors are determined, frequencies and symbol rates of transmissions from the user terminals can be adjusted to compensate for the errors. A tracking loop can also be used at the gateway to measure received frequencies and symbol rates of return link transmissions. This information can be used to determine Doppler-induced errors and transponder translation errors at the satellite. Once these errors are determined, received frequencies and symbol rates at the gateway can be adjusted to compensate for these errors. These and other embodiments of the present invention are described more fully below.

Figure 1:
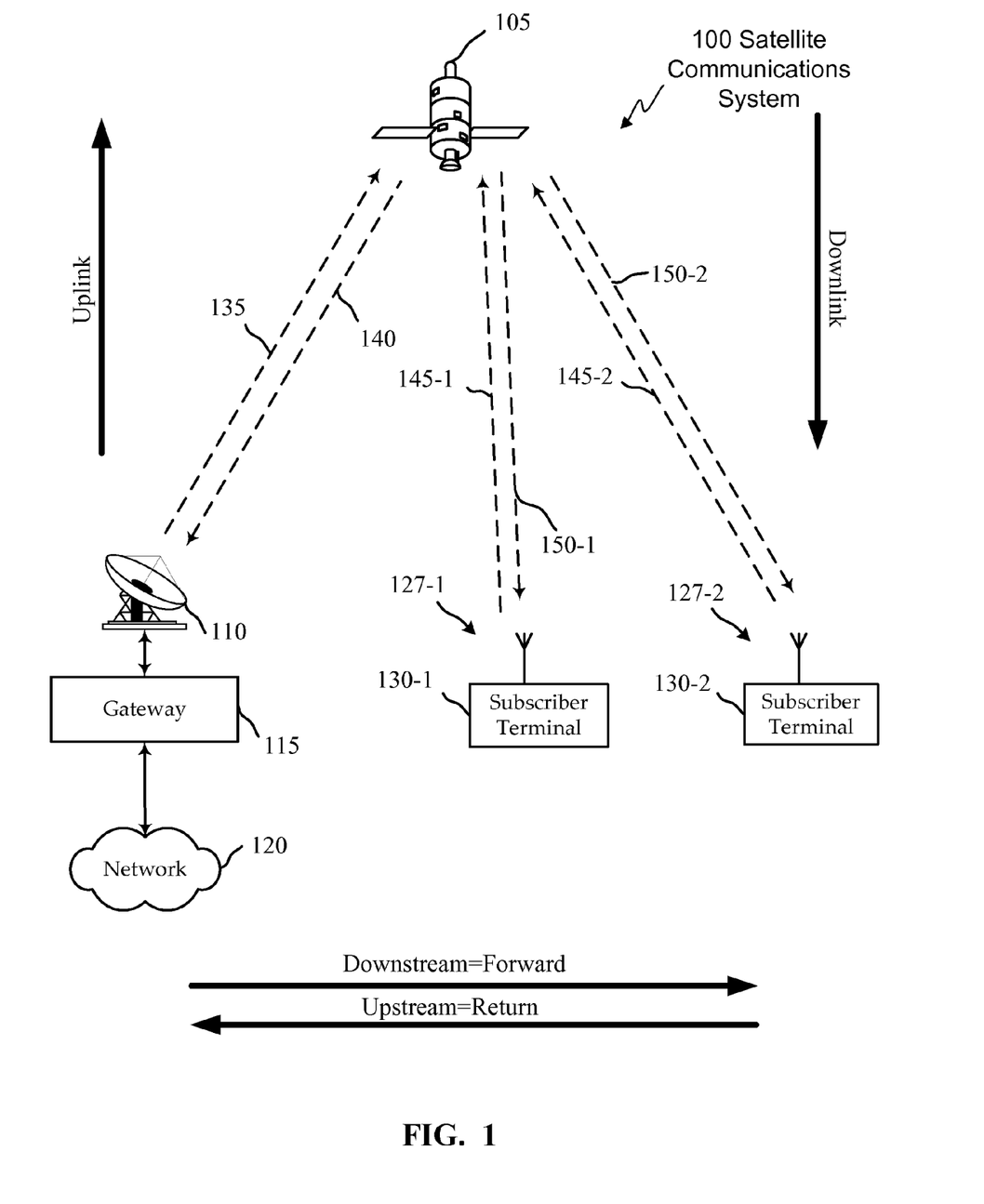
FIG. 1 is a simplified diagram of an exemplary satellite communications system in which the methods of the present invention may be implemented.

FIG. 1 is a simplified diagram of an exemplary satellite communications system 100 in which the methods of the present invention may be implemented. Satellite communications system 100 includes a network 120 interfaced with one or more gateway terminals 115. The gateway terminal 115 is configured to communicate with one or more user terminals 130 via a satellite 105.

The gateway terminal 115 is sometimes referred to as a hub or ground station. The gateway terminal 115 services uplink 135 and downlink 140 to and from the satellite 105. The gateway terminal 115 may also schedule traffic to the user terminals 130. Alternatively, the scheduling may be performed in other parts of the satellite communications system 100 (e.g., at one or more network operations centers (NOC) and/or gateway command centers). Although only one gateway terminal 115 is shown in FIG. 1, embodiments of the present invention may be implemented in satellite communications systems having a plurality of gateway terminals each of which may be coupled to one or more networks.

In some satellite communications systems, there may be a limited amount of frequency spectrum available for transmission. Communication links between the gateway terminal 115 and the satellite 105 may use the same, overlapping, or different frequencies as communication links between the satellite 105 and the user terminals 130. The gateway terminal 115 may be located remote from the user terminals 130 to enable frequency re-use.

The network 120 may be any type of network and can include, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. The network 120 may include both wired and wireless connections as well as optical links. The network 120 may connect the gateway terminal 115 with other gateway terminals that may be in communication with the satellite 105 or with other satellites.

The gateway terminal 115 provides an interface between the network 120 and the satellite 105. The gateway terminal 115 may be configured to receive data and information directed to one or more user terminals 130. The gateway terminal 115 may format the data and information for delivery to the respective user terminals 130. Similarly, the gateway terminal 115 may be configured to receive signals from the satellite 105 (e.g., from one or more user terminals 130) directed to a destination accessible via the network 120. The gateway terminal 115 may format the received signals for transmission on the network 120.

The gateway terminal 115 may use an antenna 110 to transmit a forward uplink signal 135 to the satellite 105. In one embodiment, the antenna 110 may comprise a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, low noise, and the like.

The satellite 105 may be a geostationary satellite that is configured to receive the forward uplink signals 135 from the location of the antenna 110. The satellite 105 may use, for example, a reflector antenna, a lens antenna, a phased array antenna, an active antenna, or any other mechanism known in the art for reception of such signals. The satellite 105 may process the signals received from the gateway terminal 115 and forward the downlink signals 150 to one or more of the user terminals 130. The signals may be passed through a transmit reflector antenna (e.g., a phased array antenna) to form the transmission radiation pattern (spot beam). The satellite 105 may operate in a multiple spot-beam mode, transmitting a number of narrow beams each directed at a different region of the earth. This allows segregation of the user terminals 130 into the various narrow beams.

The satellite 105 may be configured as a "bent pipe" satellite. In this configuration, the satellite 105 may perform frequency and polarization conversion of the received carrier signals before re-transmission of the signals to their destination. A spot beam may use a single carrier, i.e., one frequency, or a contiguous frequency range per beam. A variety of physical layer transmission modulation and coding techniques may be used by the satellite 105 (e.g., adaptive coding and modulation).

The satellite communications system 100 may use a number of network architectures consisting of space and ground segments. The space segment may include one or more satellites while the ground segment may include one or more user terminals, gateway terminals, network operations centers (NOCs), and satellite and gateway terminal command centers. The segments may be connected via a mesh network, a star network, or the like as would be evident to those skilled in the art.

The forward downlink signals 150 may be transmitted from the satellite 105 to one or more user terminals 130. The user terminals 130 may receive the downlink signals 150 using an antenna 127. In one embodiment, the antenna 127 and the user terminal 130 together comprise a very small aperture terminal (VSAT), with the antenna 127 measuring approximately 0.6 meters in diameter and having approximately 2 watts of power. In other embodiments, a variety of other types of antennas 127 may be used at the user terminals 130 to receive the downlink signals 150 from the satellite 105. Each of the user terminals 130 may comprise a single user terminal or, alternatively, may comprise a hub or router (not pictured) that is coupled to multiple user terminals. Each user terminal 130 may be connected to various consumer premises equipment (CPE) comprising, for example, computers, local area networks, internet appliances, wireless networks, and the like.

Figure 2:
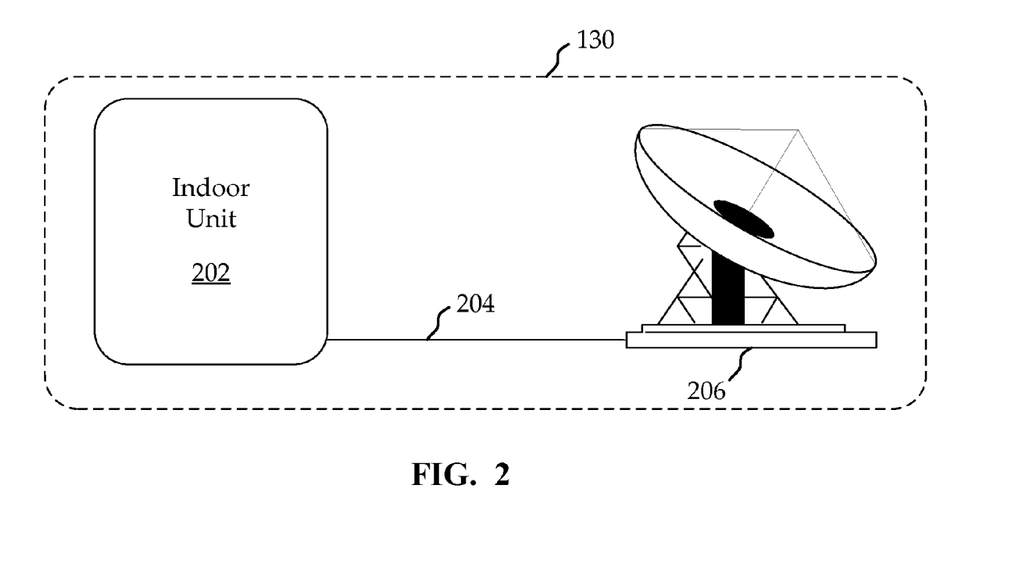
FIG. 2 is a simplified diagram of an exemplary user terminal in which some of the methods of the present invention may be implemented.

A typical user terminal 130 may include an outdoor unit (ODU) 206 and an indoor unit (IDU) 202 as illustrated in FIG. 2. The ODU 206 typically performs the front-end radio and antenna functions. The ODU 206 may also provide an interface to the IDU 202. The IDU 202 typically performs the modem and networking functions and provides an interface to users and CPEs. An inter-facility link (IFL) 204 may be a physical connection between the IDU 202 and the ODU 206. The IFL 204 may consist, for example, of a single coaxial cable of variable length depending on the physical arrangement of the components and the particular application. Further, the construction and characteristics of the IFL 204 may vary depending on functional partitioning between the IDU 202 and the ODU 206.

In a manner similar to that described above, the user terminals 130 may use return link transmissions to communicate with the gateway terminal 115 or the network 120 via the satellite 105. The return link may consist of return uplink transmissions 145 from the user terminals 130 to the satellite 105, and return downlink transmissions 140 from the satellite 105 to the gateway terminal 115. The gateway terminal 115 may format the received signals for transmission to one or more destinations that are accessible via the network 120.

A typical satellite communications system 100 may include an oscillator at the gateway 115, an oscillator at the satellite 105, and one or more oscillators at each user terminal 130. The oscillator at the gateway 115 may be used to drive transmit intermediate frequency (IF), symbol rate, and upconversion to an uplink band. The oscillator at the gateway 115 may also be used to drive downconversion from a downlink band, receive IF frequency, and receive sampling rate. The oscillator at the satellite 105 may be used to drive conversion of received signals from an uplink band to a downlink band. A typical user terminal 130 may include an oscillator at the ODU 206 that drives upconversion and downconversion and an oscillator at the IDU 202 that drives IF frequency and symbol rate.

The present invention provides methods and systems for reducing frequency and/or timing errors caused by imperfections or differences between the various oscillators. Errors can also be caused by motion of the satellite 105 (i.e., Doppler-induced errors). In accordance with embodiments of the present invention, signal parameters can be measured to estimate the frequency and/or timing errors and adjustments can be applied to compensate for the errors.

In an embodiment, the oscillator at the gateway 115 may be used as a reference from which carrier frequencies and symbol rates in the satellite communications system 100 are derived. At the user terminal 115, received forward link carrier frequencies and symbol rates can be measured. The results can be used to determine the errors associated with the IDU 202 oscillator and the ODU 206 oscillator. In an embodiment, compensations can be applied to the transmit frequency and symbol rate of the user terminal 115 to account for these errors.

Doppler-induced error and transponder translation error at the satellite 105 may not be addressed by the compensations applied at the user terminal 115. Further, the return link is subject to additional Doppler-induced and transponder translation error as the signals propagate over the return link. Consequently, signals received by a demodulator at the gateway 115 are subject to forward and return link Doppler-induced errors and satellite transponder translation errors. In an embodiment, a tracking loop may be used to measure carrier frequencies and symbol rates of return link transmissions and determine the Doppler-induced and transponder translation errors. The tracking loop may also be used to determine and apply compensations to the received frequencies and symbol rates at the gateway 115 to account for these errors.

While the compensations at the user terminal 130 and at the gateway 115 can reduce frequency and timing errors, actual system performance may also depend on:

Quality of estimators used for carrier frequency and symbol rate measurements;

Sensitivity factors determined by a frequency plan and forward link symbol rates; and Dynamics of the error sources.

In general, there is typically a tradeoff between accuracy and latency—averaging over a longer time gives better statistical performance but slows the response to changes in the value being estimated. For a given estimator and specific dynamics of the error source, a balance between root mean square (RMS) error and error due to measurement latency can be determined.

Figure 3:
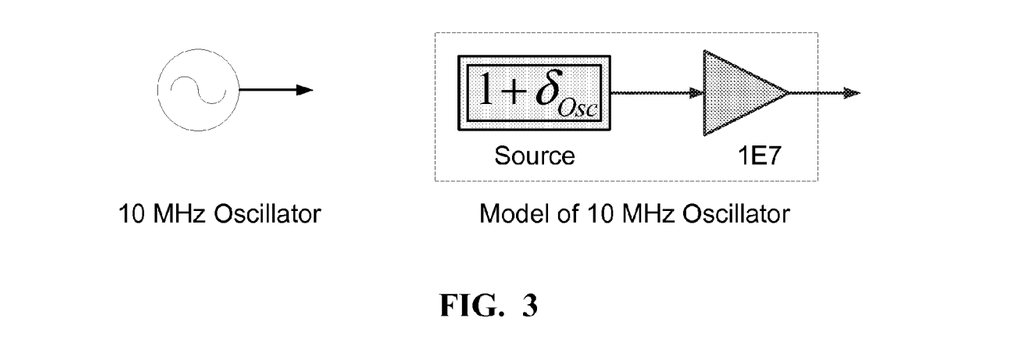
FIG. 3 is a simplified block diagram of an oscillator and a simplified model of an oscillator.
Figure 4:
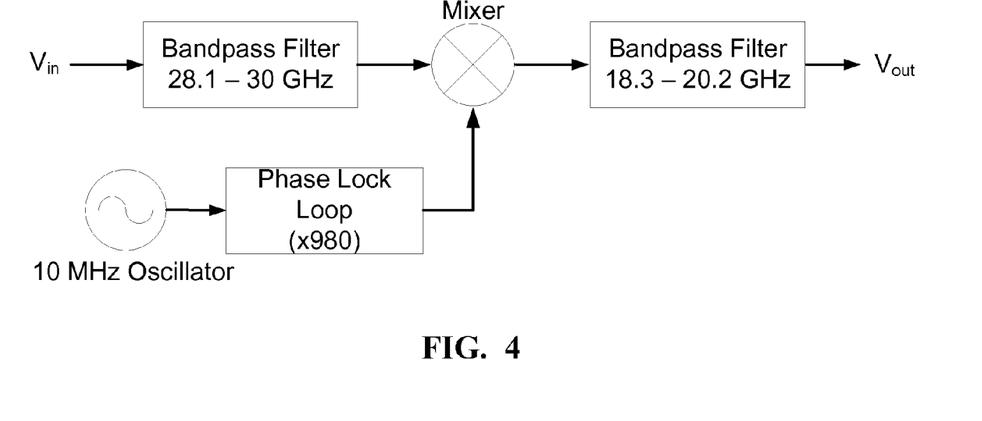
FIG. 4 is a simplified block diagram of a local oscillator and frequency conversion.
Figure 5:
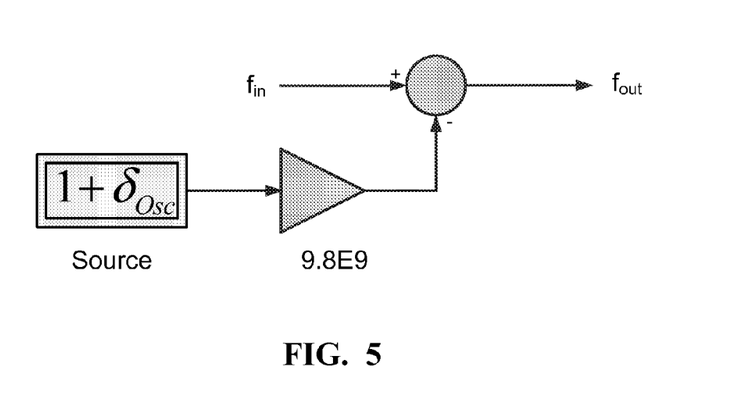
FIG. 5 is a simplified model of a local oscillator and frequency conversion.
Figure 6:
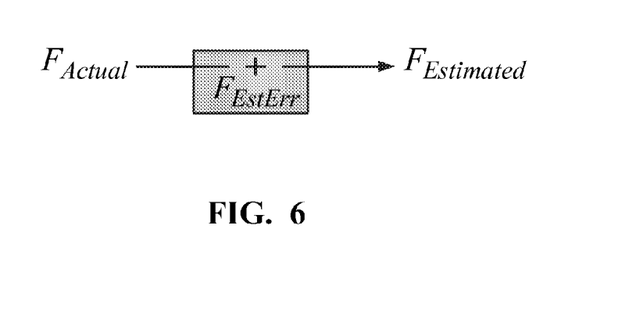
FIG. 6 is a simplified model of a frequency estimator.
Figure 7:
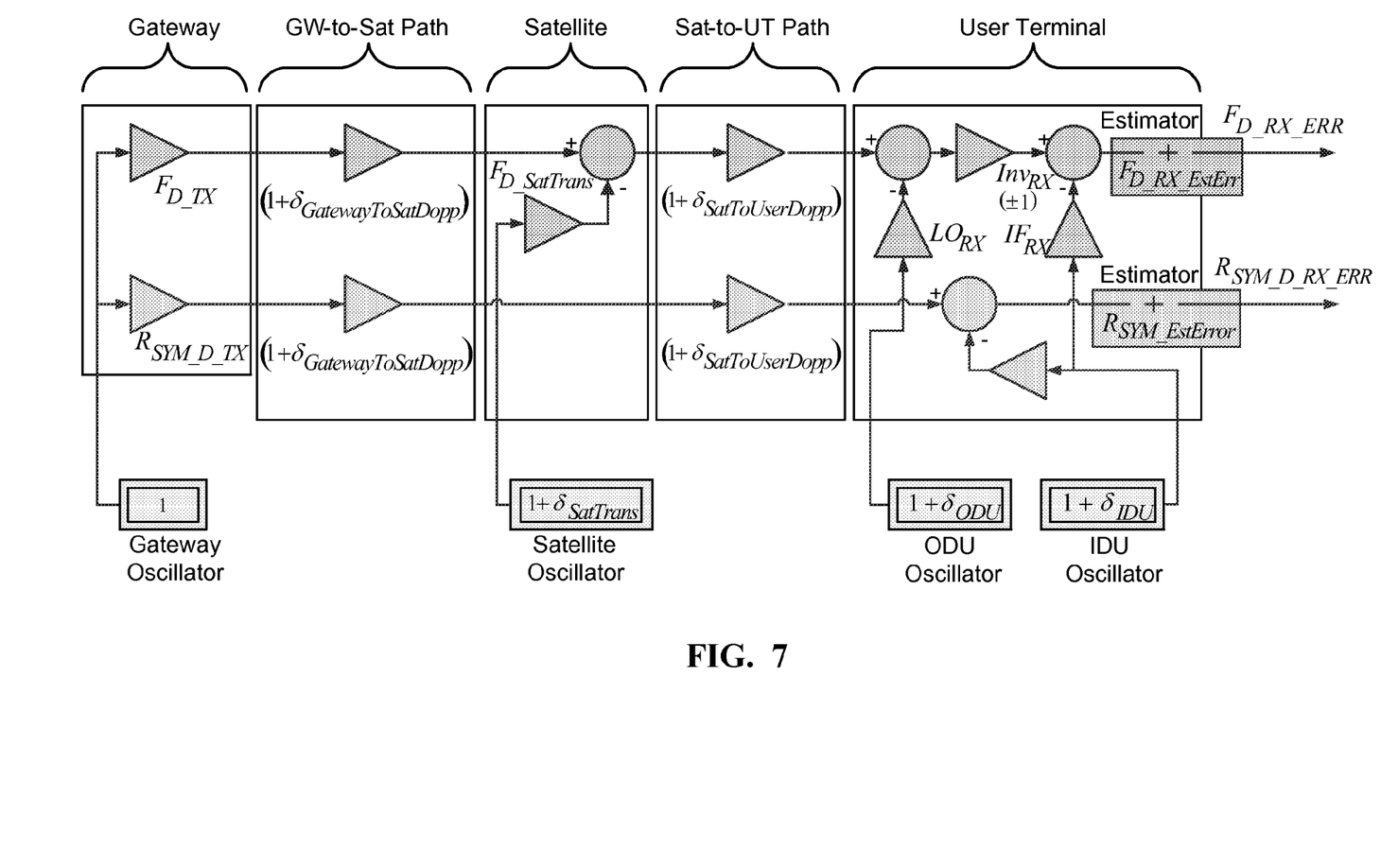
FIG. 7 is a simplified model of a forward link between a gateway and a user terminal in accordance with an embodiment of the present invention.
Figure 8:
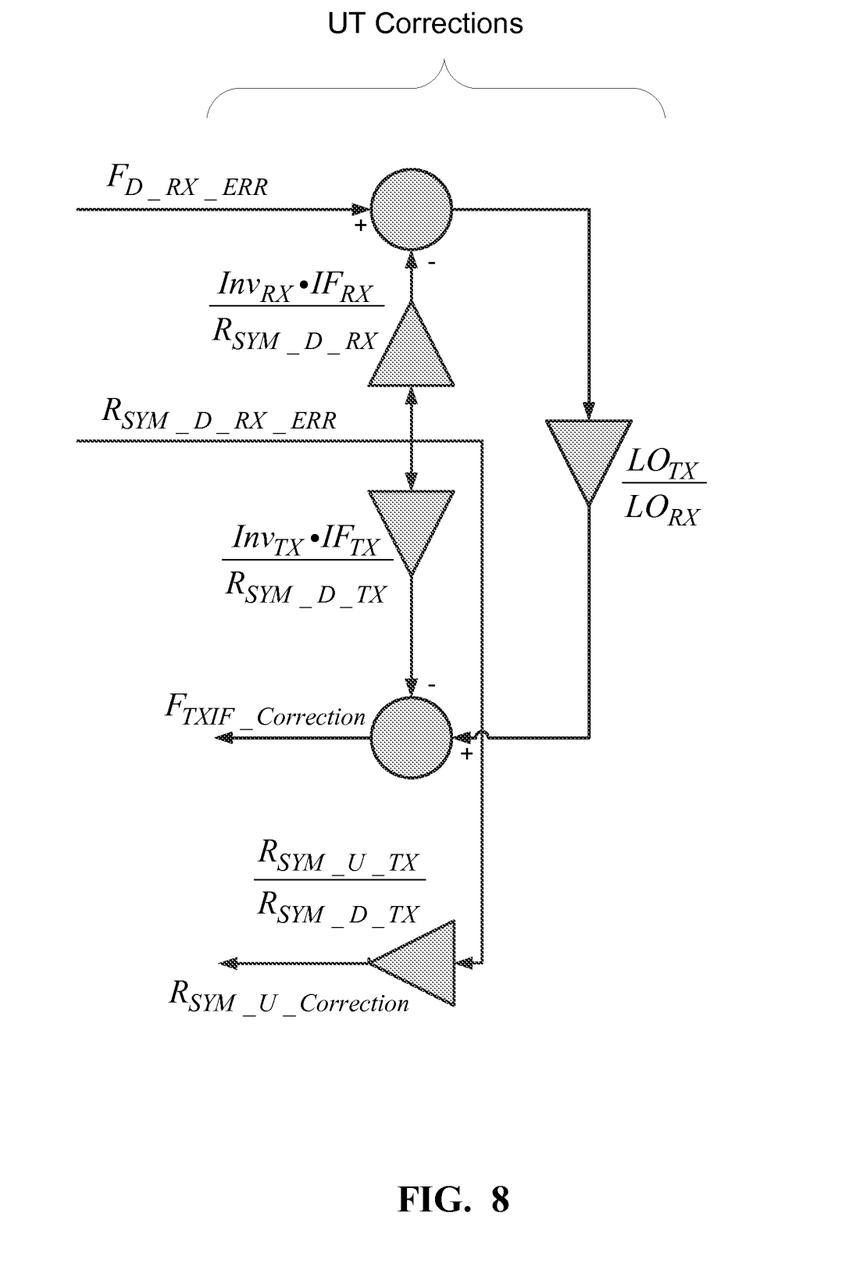
FIG. 8 is a simplified model of error corrections at a user terminal in accordance with an embodiment of the present invention.
Figure 9:
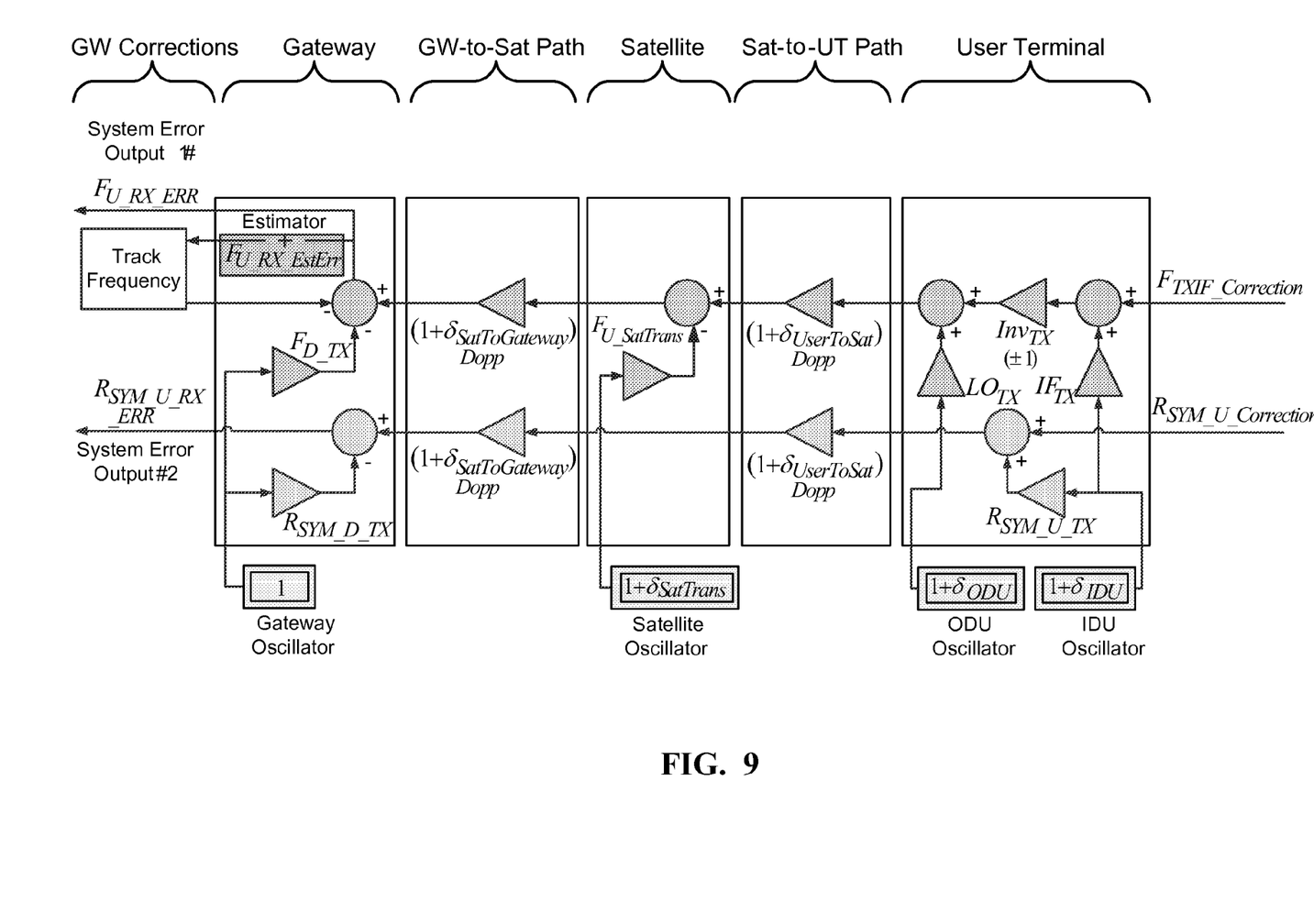
FIG. 9 is a simplified model of a return link between a user terminal and a gateway in accordance with an embodiment of the present invention.

FIGS. 7-9 are simplified models illustrating sources of frequency and symbol rate errors, as well as compensations for these errors, in a conventional satellite communications system 100. FIGS. 3-6 provide examples of some of the devices included in the models shown in FIGS. 7-9. For example oscillators, as shown in simplified block diagram format in FIG. 3, are modeled as a normalized source and a frequency multiplier as also shown in FIG. 3. In the model shown in FIG. 3, the error in the source ($\delta_{Osc}$) is fractional. If the 10 MHz oscillator has an error of −20 Hz, for example, then $\delta_{Osc}$ would be −2E6 or −2 ppm. Also included in FIGS. 7-9, local oscillators and frequency conversion, as illustrated in simplified block diagram format in FIG. 4, are modeled as a normalized source with a frequency multiplier and frequency conversion as shown in the example of FIG. 5. Frequency estimators are modeled as shown in the example of FIG. 6.

In FIGS. 7-9, brackets along a top of the figures indicate where in the system the associated blocks are found (i.e., at the gateway 115, at the satellite 105, at the user terminal 130, or along propagation paths). FIG. 7 provides a simplified model of a forward link between a gateway 115 and a user terminal 130, FIG. 8 provides a simplified model of error corrections at the user terminal 130, and FIG. 9 provides a simplified model of a return link between the user terminal 130 and the gateway 115. There are two main paths illustrated in FIGS. 7-9. In general, the top path is associated with carrier frequency and the bottom path is associated with symbol rate.

As shown in FIG. 7, the gateway oscillator provides transmissions at a downstream transmit carrier frequency ($F_{D\_TX}$) and a downstream transmit symbol rate ($R_{SYM\_D\_TX}$). Doppler-induced errors ($\delta_{GatewayToSatDopp}$) are introduced during propagation between the gateway 115 and the satellite 105. The satellite oscillator provides a downstream transponder translation frequency ($F_{D\_SatTrans}$) and introduces a downstream transponder translation error ($\delta_{SatTrans}$). Doppler-induced errors ($\delta_{SatToUserDopp}$) are introduced during propagation between the satellite 105 and the user terminal 130.

At the user terminal 130, the ODU oscillator provides a local oscillator receive frequency ($LO_{RX}$) for downconversion and introduces an ODU oscillator error ($\delta_{ODU}$), and the IDU oscillator provides a receive IF frequency ($IF_{RX}$) and introduces an IDU oscillator error ($\delta_{IDU}$). The frequency inversion ($Inv_{RX}$) is +1 if there is no frequency inversion and −1 if there is frequency inversion. The IDU oscillator also introduces an error ($\delta_{IDU}$) to the received symbol rate.

Received downstream carrier frequency ($F_{D\_RX}$) and received downstream symbol rate ($R_{SYM\_D\_RX}$) are measured (not shown) and used by the estimators to determine a downstream carrier frequency error ($F_{D\_RX\_ERR}$) and a downstream symbol rate error ($R_{SYM\_D\_RX\_ERR}$).

As shown in FIG. 8, an IF transmit correction ($F_{TXIF\_Correction}$) and an upstream symbol rate correction ($R_{SYM\_U\_Correction}$) may be determined based on the downstream carrier frequency error ($F_{D\_RX\_ERR}$) and the downstream symbol rate error ($R_{SYM\_D\_RX\_ERR}$).

As shown in FIG. 9, the IF transmit correction ($F_{TXIR\_Correction}$) is applied to a transmit IF frequency ($IF_{TX}$) from the IDU oscillator with error $\delta_{IDU}$ and a local oscillator transmit frequency ($LO_{TX}$) from the ODU oscillator with error $\delta_{ODU}$. The upstream symbol rate correction ($R_{SYM\_U\_Correction}$) is applied to an upstream transmit symbol rate ($R_{SYM\_U\_TX}$) generated using the IDU oscillator. The frequency inversion ($Inv_{RX}$) is +1 if there is no frequency inversion and −1 if there is frequency inversion. Doppler-induced errors ($\delta_{UserToSatDopp}$) are introduced during propagation between the user terminal 130 and the satellite 105. The satellite oscillator provides an upstream transponder translation frequency ($F_{U\_SatTrans}$) and introduces an upstream transponder translation error ($\delta_{SatTrans}$). Doppler-induced errors ($\delta_{SatToGatewayDopp}$) are introduced during propagation between the satellite 105 and the gateway 115.

At the gateway 115, received upstream carrier frequency ($F_{U\_RX}$) and received upstream symbol rate ($R_{SYM\_U\_RX}$) can be measured (not shown) and used to determine an upstream carrier frequency error ($F_{U\_RX\_ERR}$) and/or an upstream symbol rate error ($R_{SYM\_U\_RX\_ERR}$). A correction can be applied at the gateway to compensate for the upstream carrier frequency error ($F_{U\_RX\_ERR}$) and/or the upstream symbol rate error ($R_{SYM\_U\_RX\_ERR}$).

The following equations can be used to determine the frequencies, symbol rates, and error components in the models shown in FIGS. 7-9. Some approximations may be used in the equations that provide useful simplifications. For example, frequency errors are typically on the order of 1E6, so the product of two frequency errors produces a far smaller value that may be neglected in the analysis. The following variables are used in the equations, often with one of the superscripts nominal$^{(Nom)}$, actual$^{(Actual)}$, expected$^{(Expected)}$, and estimated$^{(Est)}$:

$F_{C\_TX}$=downstream transmit carrier frequency (from the gateway);

$F_{D\_RX}$=downstream receive carrier frequency (at the user terminal);

$F_{D\_RX\_ERR}$=downstream carrier frequency error (as computed at the user terminal);

$F_{U\_TX}$=upstream transmit carrier frequency (from the user terminal);

$F_{U\_RX}$=upstream receive carrier frequency (at the gateway);

$F_{U\_RX\_ERR}$=upstream receive carrier frequency error (as determined at the gateway);

$LO_{RX}$=local oscillator receive frequency of the ODU downconverter;

$LO_{TX}$=local oscillator transmit frequency of the ODU upconverter;

α=ratio of ODU oscillator-derived frequency conversions (i.e., $LO_{TX}^{(Nom)}/LO_{RX}^{(NOM)}$);

$\delta_{ODU}$=error of the ODU oscillator (positive values indicate higher than desired frequency);

$\delta_{IDU}$=error of the IDU oscillator (positive values indicate higher than desired frequency);

$F_{D\_SatTrans}$=downstream transponder translation frequency (positive values reflect translation down in frequency);

$\delta_{D\_SatTrans}$=downstream transponder translation error (positive values reflect larger than desired downward translation);

$F_{U\_SatTrans}$=upstream transponder translation frequency (positive values reflect translation down in frequency);

$\delta_{U\_SatTrans}$=upstream transponder translation error (positive values reflect larger than desired downward translation);

$\delta_{GatewayToSatDopp}$=error due to Doppler from the gateway to the satellite;

$\delta_{SatToUserDopp}$=error due to Doppler from the satellite to the user terminal;

$IF_{RX}$=receive IF frequency at the IDU;

$IF_{TX}$=transmit IF frequency at the IDU;

$R_{SYM\_D\_TX}$=downstream transmit symbol rate (transmitted from the gateway);

$R_{SYM\_D\_RX}$=downstream receive symbol rate (received at the user terminal);

$R_{SYM\_D\_RX\_ERR}$=downstream symbol rate error (as determined at the user terminal);

$R_{SYM\_U\_TX}$=upstream transmit symbol rate (transmitted from the user terminal);

$R_{SYM\_U\_RX}$=upstream receive symbol rate (received at the gateway);

$R_{SYM\_U\_RX\_ERR}$=upstream symbol rate error (as determined at the gateway);

$Inv_{TX}$ and $Inv_{TX}$=+1 if no frequency inversion, −1 if there is frequency inversion;

$\in_{RSym\_D\_RX}$=downstream symbol rate estimation error;

$\in_{F\_D\_RX}$=downstream frequency estimation error; and $\in_{F\_U\_RX}$=upstream frequency estimation error.

The following relationships between nominal values are also used in the equations:

$$F_{D\_RX}^{(Nom)} = LO_{RX}^{(Nom)} + Inv_{RX} \cdot IF_{RX}^{(Nom)} \quad (1)$$

$$F_{U\_TX}^{(Nom)} = LO_{TX}^{(Nom)} + Inv_{TX} IF_{TX}^{(Nom)} \quad (2)$$

$$F_{D\_RX}^{(Nom)} = F_{D\_TX}^{(Nom)} - F_{D\_SatTrans}^{(Nom)} \quad (3)$$

$$F_{U\_RX}^{(Nom)} = F_{U\_TX}^{(Nom)} - F_{U\_SatTrans}^{(Nom)} \quad (4)$$

Frequency Error at the User Terminal

A user terminal 130 in the satellite communications system 100 is typically configured to receive transmissions at nominal frequency $F_{D\_RX}^{(Nom)}$, but frequency settings are affected by oscillator errors $\delta_{ODU}$ and $\delta_{IDU}$. Thus, the expected receive carrier frequency is:

$$F_{D\_RX}^{(Expected)} = LO_{RX}^{(Nom)} \cdot (1+\delta_{ODU}) + Inv_{RX} \cdot IF_{RX}^{(Nom)} \cdot (1+\delta_{IDU}) \quad (5)$$

The actual frequency is also affected by Doppler-induced and satellite transponder translation errors as shown by the equation:

$$F_{D\_RX}^{(Actual)} \approx F_{D\_RX}^{(Nom)} \cdot (1+\delta_{SatToUserDopp}) + F_{D\_TX}^{(Nom)} \cdot \delta_{GatewayToSatDopp} - F_{D\_SatTrans}^{(Nom)} \cdot \delta_{D\_SatTrans} \quad (6)$$

So the received frequency error at the user terminal 130 is:

$$F_{D\_RX\_Err} = F_{D\_RX}^{(Actual)} - F_{D\_RX}^{(Expected)} \quad (7)$$

or $$F_{D\_RX\_Err} \approx LO_{RX}^{(Nom)} \cdot (\delta_{SatToUserDopp} - \delta_{ODU}) + Inv_{RX} \cdot IF_{RX}^{(Nom)} \cdot (\delta_{SatToUserDopp} - \delta_{IDU}) + F_{D\_TX}^{(Nom)} \cdot \delta_{GatewayToSatDopp} - F_{D\_SatTrans} \cdot \delta_{D\_SatTrans} \quad (8)$$

Equation (8) shows the influence of ODU oscillator error, IDU oscillator error, satellite oscillator error, and Doppler-induced error on the received carrier frequency at the user terminal 130.

Symbol Rate Error at the User Terminal

Actual and nominal values of the downstream symbol rate ($R_{SYM\_D\_TX}$) transmitted from the gateway 115 are the same. The expected receive symbol rate at the user terminal 130 is affected by IDU oscillator error as shown by:

$$R_{SYM\_D\_RX}^{(Expected)} = R_{SYM\_D\_TX}^{(Nom)} \cdot (1+\delta_{IDU}) \quad (9)$$

The actual received symbol rate is also affected by Doppler-induced error as shown by:

$$R_{SYM\_D\_RX}^{(Actual)} \approx R_{SYM\_D\_TX}^{(Nom)} \cdot (1+\delta_{GatewayToSatDopp} + \delta_{SatToUserDopp}) \quad (10)$$

So the received symbol rate error at the user terminal 130 is:

$$R_{SYM\_D\_RX\_ERR} = R_{SYM\_D\_RX}^{(Actual)} - R_{SYM\_D\_RX}^{(Expected)} \quad (11)$$

or $$R_{SYM\_D\_RX\_ERR} \approx R_{SYM\_D\_TX}^{(Nom)} \cdot (\delta_{GatewayToSatDopp} + \delta_{SatToUserDopp} - \delta_{IDU}) \quad (12)$$

Equation (12) shows the influence of IDU oscillator error and Doppler-induced error on the received symbol rate at the user terminal 130.

Corrections to the carrier frequency and symbol rate to compensate for the errors determined using Equations (8) and (12), respectively, can be determined and applied to transmissions from the user terminal 130. The following equations solve for the corrections and apply the corrections to the transmit frequency and symbol rate from the user terminal 130.

Corrected Transmit Frequency at the User Terminal

Two corrections can be made based on the received symbol rate at the user terminal 130. The first correction can be made to the upstream transmit frequency, and the second correction can be made to the received downstream carrier frequency. Equation (12) shows that the received symbol rate error at the user terminal 130 has both IDU oscillator and Doppler-induced components. The estimated symbol rate error has an additional estimation error component as shown by:

$$R_{SYM\_D\_RX\_ERR}^{(Est)} \approx R_{SYM\_D\_TX}^{(Nom)} \cdot (\delta_{GatewayToSatDopp} + \delta_{SatToUserDopp} - \delta_{IDU}) + \in_{RStm\_D\_Rx} \quad (13)$$

In a conventional satellite communications system 100, the IDU oscillator component will dominate and the other error components can be dropped. A correction for the IDU oscillator error can be added to the transmit IF frequency as shown by:

$$F_{TXIF\_Correction\_1} = \frac{R_{SYM\_D\_RX\_ERR}^{(Est)}}{R_{SYM\_D\_TX}^{(Nom)}} \cdot Inv_{TX} \cdot IF_{TX}^{(Nom)} \quad (14)$$

The second correction is to remove temperature-compensated crystal oscillator (TCXO) contributions from the receive carrier frequency measurement at the user terminal. This provides an estimated carrier frequency error of:

$$F_{D\_RX\_Err} = F_{D\_RX}^{(Actual)} - F_{D\_RX}^{(Expected)} + \in_{F\_D\_RX} \quad (15)$$

and an adjusted carrier frequency error of:

$$F_{D\_RX\_Err}^{(Adjusted)} = F_{D\_RX\_Err}^{(Est)} - F_{RX\_Correction} \quad (16)$$

where $$F_{RX\_Correction} = Inv_{RX} \cdot IF_{RX}^{(Nom)} \frac{R_{SYM\_D\_RX\_ERR}^{(Est)}}{R_{SYM\_D\_TX}^{(Nom)}} \quad (17)$$

The adjusted carrier frequency error in Equation (16) includes error attributable primarily to the ODU oscillator. A correction can be made to the upstream transmit frequency to remove the ODU oscillator error by adding a scaled correction term given by:

$$F_{TXIF\_Correction\_2} = F_{D\_RX\_Err}^{(Adjusted)} \cdot \alpha \quad (18)$$

The actual upstream transmit frequency with both corrections is given by:

$$F_{U\_TX,corrected}^{(Actual)} = F_{U\_TX,uncorrected}^{(Actual)} + F_{TXIF\_Correction\_1} + F_{TXIF\_Correction\_2} \quad (19)$$

or $$F_{U\_TX,corrected}^{(Actual)} = LO_{TX}^{(nom)} \cdot (1 + \delta_{ODU}) + Inv_{TX}^{(Nom)} \cdot (1 + \delta_{IDU}) + \quad (20)$$
$$(\delta_{GatewayToSatDopp} + \delta_{SatToUserDopp} - \delta_{IDU}) \cdot Inv_{TX} \cdot IF_{TX}^{(Nom)} +$$
$$\varepsilon_{RSym\_D\_Rx} \cdot \left( \frac{Inv_{TX} \cdot IF_{TX}^{(Nom)}}{R_{SYM\_D\_TX}^{(Nom)}} \right) +$$
$$\alpha \cdot LO_{RX}^{(Nom)} \cdot (\delta_{SatToUserDopp} - \delta_{ODU}) +$$
$$\alpha \cdot Inv_{RX} \cdot IF_{RX}^{(Nom)} (\delta_{SatToUserDopp} - \delta_{IDU}) +$$
$$\alpha \cdot F_{D\_TX}^{(Nom)} \cdot \delta_{SatToUserDopp} - \alpha \cdot F_{D\_SatTrans} + \alpha \cdot \varepsilon_{F\_D\_RX} -$$
$$\alpha \cdot Inv_{RX} \cdot IF_{RX}^{(Nom)} \cdot (\delta_{GatewayToSatDopp} + \delta_{SatToUserDopp} - \delta_{IDU}) -$$
$$\alpha \cdot \varepsilon_{RSym\_D\_Rx} \cdot \left( \frac{Inv_{RX} \cdot IF_{RX}^{(Nom)}}{R_{SYM\_D\_TX}^{(Nom)}} \right)$$

Simplifying provides:

$$F_{U\_TX,corrected}^{(Actual)} \approx \quad (21)$$
$$LO_{TX}^{(Nom)} + (1 + \delta_{GatewayToSatDopp} + \delta_{SatToUserDopp}) \cdot Inv_{TX} \cdot IF_{TX}^{(Nom)} +$$
$$\alpha \cdot LO_{RX}^{(Nom)} \cdot \delta_{SatToUserDopp} + \alpha \cdot F_{D\_TX}^{(Nom)} \cdot \delta_{GatewayToSatDopp} -$$
$$\alpha \cdot F_{D\_SatTrans} \cdot \delta_{D\_SatTrans} - \alpha \cdot Inv_{RX} \cdot IF_{RX}^{(Nom)} \cdot \delta_{GatewayToSatDopp} -$$
$$\alpha \cdot \varepsilon_{F\_D\_RX} \cdot \left[ \left( \frac{Inv_{TX} \cdot IF_{TX}^{(Nom)}}{R_{SYM\_D\_TX}^{(Nom)}} \right) - \alpha \cdot \left( \frac{Inv_{TX} \cdot IF_{RX}^{(Nom)}}{R_{SYM\_D\_TX}^{(Nom)}} \right) \right]$$

Corrected Transmit Symbol Rate at the User Terminal

Equation (13) shows that estimated symbol rate error has an IDU oscillator error component, uplink and downlink Doppler-induced error components, and an estimation error component. The following corrections can be made as if the IDU oscillator error is the only component:

$$R_{SYM\_U\_Correction} = \frac{R_{SYM\_D\_RX\_ERR}^{(Est)}}{R_{SYM\_D\_TX}^{(Nom)}} \cdot R_{SYM\_U\_TX}^{(Nom)} \quad (22)$$

and the equation for actual corrected symbol rate as transmitted by the user terminal 130 is shown by:

$$R_{SYM\_U\_TX,corrected}^{(Actual)} = R_{SYM\_U\_TX,uncorrected}^{(Actual)} + R_{SYM\_U\_Correction} \quad (23)$$

or $$R_{SYM\_U\_TX,corrected}^{(Actual)} \approx R_{SYM\_U\_TX}^{(Nom)} \cdot \left( 1 + \delta_{IDU} + \frac{R_{SYM\_D\_RX\_ERR}^{(Est)}}{R_{SYM\_D\_TX}^{(Nom)}} \right) \quad (24)$$

or $$R_{SYM\_U\_TX,corrected}^{(Actual)} \approx \quad (25)$$
$$R_{SYM\_U\_TX}^{(Nom)} \cdot (1 + \delta_{GatewayToSatDopp} + \delta_{SatToUserDopp}) +$$
$$\varepsilon_{RSym\_D\_Rx} \cdot \left( \frac{R_{SYM\_U\_TX}^{(Nom)}}{R_{SYM\_D\_TX}^{(Nom)}} \right)$$

Receive Frequency Error at the Gateway

In a manner similar to that outlined above, the receive frequency and symbol rates at the gateway 115 can be determined as well as the error components in the frequency and symbol rates. The transmit frequency at the user terminal may be set to nominal (see Equation (2)), but it may be affected by dielectric resonator oscillator (DRO) error and TCXO error as shown by:

$$F_{U\_TX,uncorrected}^{(Actual)} = LO_{TX}^{(Nom)} \cdot (1 + \delta_{ODU}) + Inv_{TX} \cdot IF_{TX}^{(Nom)} \cdot (1 + \delta_{IDU}) \quad (26)$$

The gateway 115 receive frequency may also be affected by Doppler-induced and satellite transponder translations errors:

$$F_{U\_RX,uncorrected}^{(Actual)} \approx F_{U\_TX,uncorrected}^{(Actual)} \cdot (1 + \delta_{SatToUserDopp}) + F_{U\_RX}^{(Nom)} \cdot \delta_{GatewayToSatDopp} - F_{U\_SatTrans}^{(Nom)} \cdot (1 + \delta_{U\_SatTrans}) \quad (27)$$

The expected receive frequency at the gateway 115 may be shown by:

$$F_{U\_RX}^{(Expected)} = F_{U\_RX}^{(Nom)} F_{U\_TX}^{(Nom)} - F_{U\_SatTrans}^{(Nom)} \quad (28)$$

and the uncorrected receive frequency error at the gateway 115 is:

$$F_{U\_Rx\_Err,uncorrected} = F_{U\_RX,uncorrected}^{(Actual)} - F_{U\_RX}^{(Expected)} \quad (29)$$

or $$F_{U\_Rx\_Err,uncorrected} = LO_{TX}^{(Nom)} \cdot (\delta_{ODU} + \delta_{SatToUserDopp}) + Inv_{TX} IF_{TX}^{(Nom)} \cdot (\delta_{IDU} + \delta_{SatToUserDopp}) + F_{U\_RX}^{(Nom)} \cdot \delta_{GatewayToSatDopp} \cdot F_{U\_SatTrans}^{(Nom)} \cdot \delta_{U\_SatTrans} \quad (30)$$

Receive Frequency Correction at the Gateway

Applying Doppler-induced error and satellite transponder translation error to the corrected transmit frequency from the user terminal 130 provides actual received frequency at the gateway 115:

$$F_{U\_RX,corrected}^{(Actual)} \approx F_{U\_TX,corrected}^{(Actual)} \cdot (1 + \delta_{SatToUserDopp}) + F_{U\_RX}^{(Nom)} \cdot \delta_{GatewayToSatDopp} - F_{U\_SatTrans}^{(Nom)} \cdot (1 + \delta_{U\_SatTrans}) \quad (31)$$

or

-continued
$$F_{U\_RX,corrected}^{(Actual)} = LO_{TX}^{(Nom)} \cdot (1 + \delta_{SatToUserDopp}) + \quad (32)$$
$$(1 + \delta_{GatewayToSatDopp} + 2\delta_{SatToUserDopp}) \cdot Inv_{TX} \cdot IF_{TX}^{(Nom)} +$$
$$\alpha \cdot LO_{RX}^{(Nom)} \cdot \delta_{SatToUserDopp} +$$
$$\alpha \cdot F_{D\_TX}^{(Nom)} \cdot \delta_{GatewayToSatDopp} - \alpha \cdot F_{D\_SatTrans} \cdot \delta_{D\_SatTrans} -$$
$$\alpha \cdot Inv_{RX} \cdot IF_{RX}^{(Nom)} \cdot \delta_{GatewayToSatDopp} - \alpha \cdot \varepsilon_{F\_D\_RX} +$$
$$\varepsilon_{RSym\_D\_Rx} \cdot \left[ \left( \frac{Inv_{TX} \cdot IF_{TX}^{(Nom)}}{R_{SYM\_D\_TX}^{(Nom)}} \right) - \alpha \cdot \left( \frac{Inv_{RX} \cdot IF_{RX}^{(Nom)}}{R_{SYM\_D\_TX}^{(Nom)}} \right) \right] +$$
$$F_{D\_RX}^{(Nom)} \cdot \delta_{GatewayToSatDopp} - F_{U\_SatTrans}^{(Nom)} \cdot (1 + \delta_{U\_SatTrans})$$

Substituting $F_{D\_RX}^{(Nom)}$ for several terms gives:

$$F_{U\_RX,corrected}^{(Actual)} = F_{U\_RX}^{(Nom)} \cdot \delta_{SatToUserDopp} + \quad (33)$$
$$(\delta_{GatewayToSatDopp} + 2\delta_{SatToUserDopp}) \cdot Inv_{TX} \cdot IF_{TX}^{(Nom)} +$$
$$\alpha \cdot LO_{RX}^{(Nom)} \cdot \delta_{SatToUserDopp} +$$
$$\alpha \cdot F_{D\_TX}^{(Nom)} \cdot \delta_{GatewayToSatDopp} - \alpha \cdot F_{D\_SatTrans} \cdot \delta_{D\_SatTrans} -$$
$$\alpha \cdot Inv_{RX} \cdot IF_{RX}^{(Nom)} \cdot \delta_{GatewayToSatDopp} \alpha \cdot \varepsilon_{F\_D\_RX} +$$
$$\varepsilon_{RSym\_D\_Rx} \cdot \left[ \left( \frac{Inv_{TX} \cdot IF_{TX}^{(Nom)}}{R_{SYM\_D\_TX}^{(Nom)}} \right) - \alpha \cdot \left( \frac{Inv_{RX} \cdot IF_{RX}^{(Nom)}}{R_{SYM\_D\_TX}^{(Nom)}} \right) \right] +$$
$$F_{U\_RX}^{(Nom)} \cdot \delta_{GatewayToSatDopp} - F_{U\_SatTrans}^{(Nom)} \cdot \delta_{U\_SatTrans}$$

Recognizing that $F_{U\_RX}^{(Nom)}$ is the expected receive frequency at the gateway 115, the error with corrections to the transmit frequency is:

$$F_{U\_Rx\_Err,PartiallyCorrected} = F_{U\_RX,corrected}^{(Actual)} - F_{U\_RX}^{(Nom)} \quad (34)$$

or $$F_{U\_Rx\_Err,PartiallyCorrected} = 2 \cdot LO_{TX}^{(Nom)} \cdot \delta_{SatToUserDopp} + \quad (35)$$
$$(\delta_{GatewayToSatDopp} + 2\delta_{SatToUserDopp}) \cdot Inv_{TX} \cdot IF_{TX}^{(Nom)} +$$
$$\alpha \cdot F_{D\_TX}^{(Nom)} \cdot \delta_{GatewayToSatDopp} - \alpha \cdot F_{D\_SatTrans} \cdot \delta_{D\_SatTrans} -$$
$$\alpha \cdot Inv_{RX} \cdot IF_{RX}^{(Nom)} \cdot \delta_{GatewayToSatDopp} + \alpha \cdot \varepsilon_{F\_D\_RX} +$$
$$\varepsilon_{RSym\_D\_Rx} \cdot \left[ \left( \frac{Inv_{TX} \cdot IF_{TX}^{(Nom)}}{R_{SYM\_D\_TX}^{(Nom)}} \right) - \alpha \cdot \left( \frac{Inv_{RX} \cdot IF_{RX}^{(Nom)}}{R_{SYM\_D\_TX}^{(Nom)}} \right) \right] +$$
$$F_{U\_RX}^{(Nom)} \cdot \delta_{GatewayToSatDopp} - F_{U\_SatTrans}^{(Nom)} \cdot \delta_{U\_SatTrans}$$

Rearranging terms and substituting provides:

$$F_{U\_Rx\_Err,PartiallyCorrected} = 2 \cdot \delta_{SatToUserDopp} \cdot F_{U\_TX}^{(Nom)} + \delta_{GatewayToSatDopp} \cdot \quad (36)$$
$$(Inv_{TX} \cdot IF_{TX}^{(Nom)} + \alpha \cdot F_{D\_TX}^{(Nom)} - \alpha \cdot Inv_{RX} \cdot IF_{RX}^{(Nom)} + F_{U\_RX}^{(Nom)}) -$$
$$\alpha \cdot F_{D\_SatTrans} \cdot \delta_{U\_SatTrans} - F_{U\_SatTrans}^{(Nom)} \cdot \delta_{U\_SatTrans} + \alpha \cdot \varepsilon_{F\_D\_RX} +$$
$$\varepsilon_{RSym\_D\_Rx} \cdot \left[ \left( \frac{Inv_{TX} \cdot IF_{TX}^{(Nom)}}{R_{SYM\_D\_TX}^{(Nom)}} \right) - \alpha \cdot \left( \frac{Inv_{RX} \cdot IF_{RX}^{(Nom)}}{R_{SYM\_D\_TX}^{(Nom)}} \right) \right]$$

Further simplifying provides:

$$F_{U\_Rx\_Err,PartiallyCorrected} = \quad (37)$$
$$2 \cdot (\delta_{SatToUserDopp} + \delta_{GatewayToSatDopp}) \cdot F_{U\_TX}^{(Nom)} +$$

-continued
$$\delta_{GatewayToSatDopp} \cdot (\alpha \cdot F_{D\_SatTrans}^{(Nom)} - F_{U\_SatTrans}^{(Nom)}) -$$
$$\alpha \cdot F_{D\_SatTrans}^{(Nom)} \cdot \delta_{U\_SatTrans} - F_{U\_SatTrans}^{(Nom)} \cdot \delta_{U\_SatTrans} + \alpha \cdot \varepsilon_{F\_D\_RX} +$$
$$\varepsilon_{RSym\_D\_Rx} \cdot \left[ \left( \frac{Inv_{TX} \cdot IF_{TX}^{(Nom)}}{R_{SYM\_D\_TX}^{(Nom)}} \right) - \alpha \cdot \left( \frac{Inv_{RX} \cdot IF_{RX}^{(Nom)}}{R_{SYM\_D\_TX}^{(Nom)}} \right) \right]$$

Receive Symbol Rate Error at the Gateway

The symbol rate transmitted from the user terminal 130 is set to nominal but may be affected by IDU oscillator error as shown by:

$$R_{SYM\_U\_TX,uncorrected}^{(Actual)} = R_{SYM\_U\_TX}^{(Nom)} \cdot (1 + \delta_{IDU}) \quad (38)$$

The gateway receive symbol rate may also be affected by Doppler-induced error:

$$R_{SYM\_U\_RX,uncorrected}^{(Actual)} \approx R_{SYM\_U\_TX,uncorrected}^{(Actual)} \cdot (1 + \delta_{SatToUserDopp} + \delta_{GatewayToSatDopp}) \quad (39)$$

The gateway receive symbol rate may be expressed as:

$$R_{SYM\_U\_RX}^{(Expected)} = R_{SYM\_U\_RX}^{(Nom)} = R_{SYM\_U\_TX}^{(Nom)} \quad (40)$$

The uncorrected gateway receive symbol rate error is:

$$R_{SYM\_U\_U\_RX\_ERR,uncorrected} = R_{SYM\_U\_RX,uncorrected}^{(Actual)} - R_{SYM\_U\_RX}^{(Expected)} \quad (41)$$

or $$R_{SYM\_U\_RX,uncorrected} \approx R_{SYM\_U\_TX}^{(Nom)} \cdot (\delta_{IDU} + \delta_{SatToUserDopp} + \delta_{GatewayToSatDopp}) \quad (42)$$

Receive Symbol Rate Correction at the Gateway

The gateway symbol rate is affected by Doppler-induced error as shown by:

$$R_{SYM\_U\_RX,corrected}^{(Actual)} \approx \quad (43)$$
$$R_{SYM\_U\_TX,corrected}^{(Actual)} \cdot (1 + \delta_{SatToUserDopp} + \delta_{GatewayToSatDopp}) \approx$$
$$R_{SYM\_U\_TX}^{(Nom)} \cdot (1 + 2\delta_{SatToUserDopp} + 2\delta_{GatewayToSatDopp}) +$$
$$\varepsilon_{RSym\_D\_Rx} \cdot \left( \frac{R_{SYM\_U\_TX}^{(Nom)}}{R_{SYM\_D\_TX}^{(Nom)}} \right)$$

The expected gateway receive symbol rate is $F_{SYM\_U\_TX}^{(Nom)}$, and the corrected gateway receive symbol rate error is:

$$R_{SYM\_U\_RX\_ERR,corrected} = R_{SYM\_U\_RX,corrected}^{(Actual)} - R_{SYM\_U\_TX}^{(Nom)} \quad (44)$$

or $$R_{SYM\_U\_RX\_ERR,corrected} \approx \quad (45)$$
$$2 R_{SYM\_U\_TX}^{(Nom)} \cdot (\delta_{SatToUserDopp} + \delta_{GatewayToSatDopp}) +$$
$$\varepsilon_{RSym\_D\_Rx} \cdot \left( \frac{R_{SYM\_U\_TX}^{(Nom)}}{R_{SYM\_D\_TX}^{(Nom)}} \right)$$

As shown in Equation (37), the corrected receive frequency at the gateway 115 has components related to Doppler-induced and satellite transponder translation errors. These components generally change slowly and are common to all user terminals 130. In an embodiment, the magnitude of these components can be determined and a correction applied using a common-mode frequency tracking loop. As an example, the frequency of a subset of the return link bursts received at the gateway 115 can be measured and the measurements used to drive the tracking loop. In some embodiments, the subset of bursts may include extra bursts introduced into the system to provide sufficiently reliable measurements in lightly loaded situations. The process may include averaging the frequency estimates from all or a portion of the bursts received at the gateway 115 within a specified time period. The loop variance may be driven by a number of bursts per second, a distribution of burst lengths, and/or modcode points. One of ordinary skill in the art would recognize many variations, modifications, and alternatives based on the present disclosure.

Figure 10:
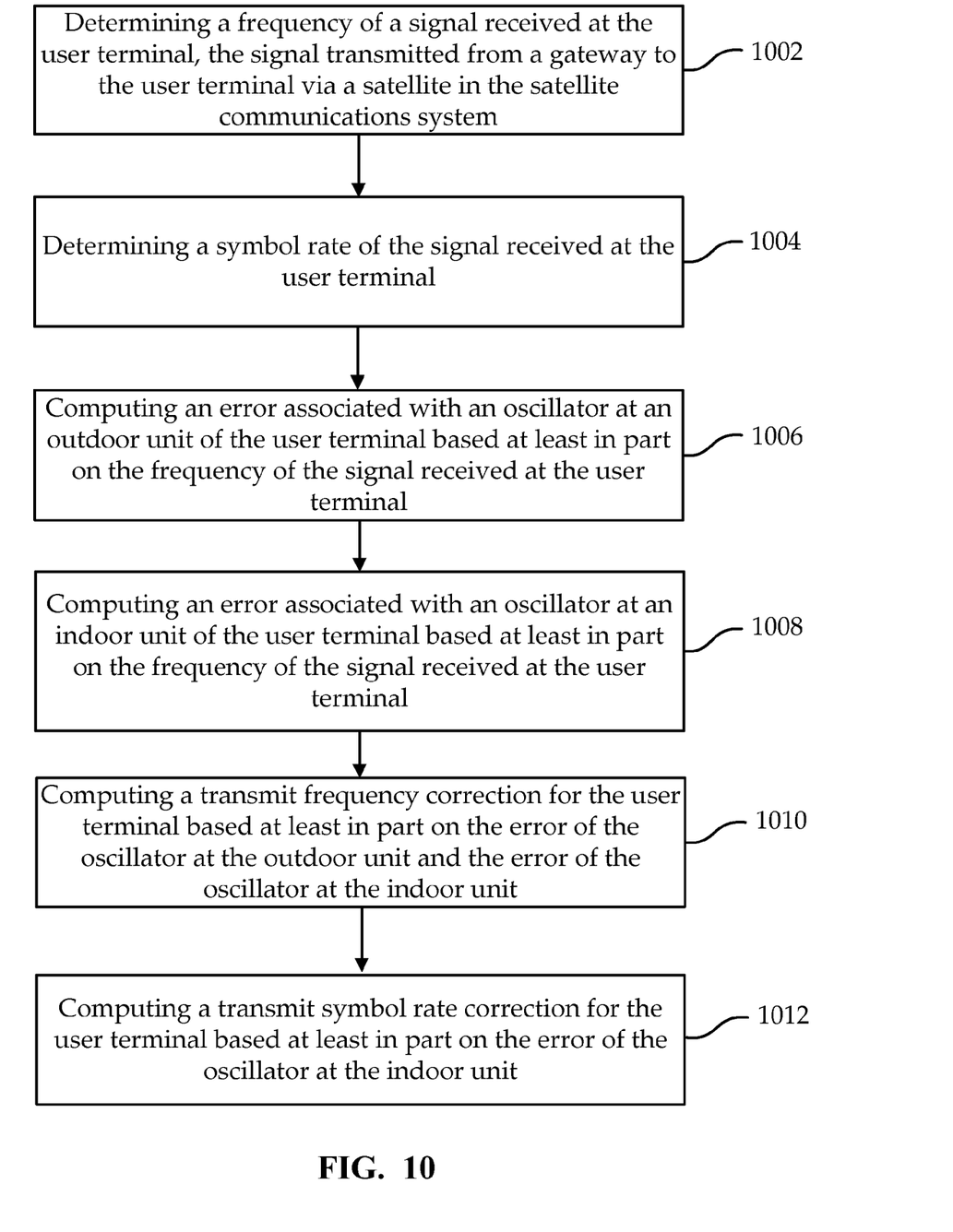
FIG. 10 is a simplified flowchart illustrating an exemplary method for determining a frequency correction and a symbol rate correction for transmissions transmitted from a user terminal in a satellite communications system in accordance with an embodiment of the present invention.

FIG. 10 is a simplified flowchart illustrating an exemplary method for determining a frequency correction and a symbol rate correction for transmissions from a user terminal in a satellite communications system in accordance with an embodiment of the present invention. The method includes determining a frequency of a signal received at the user terminal, where the signal is transmitted from a gateway to the user terminal via a satellite in the satellite communications system (1002). In an embodiment, determining the frequency of the signal received at the user terminal may comprise measuring the frequency of the signal using a demodulator at the user terminal. The method also includes determining a symbol rate of the signal received at the user terminal (1004). The method also includes computing an error associated with an oscillator at an outdoor unit of the user terminal based at least in part on the frequency of the signal received at the user terminal (1006). In an embodiment, the error associated with the oscillator at the outdoor unit may be based on the frequency of the signal as transmitted from the gateway. The method also includes computing an error associated with an oscillator at an indoor unit of the user terminal based at least in part on the frequency of the signal received at the user terminal (1008). In an embodiment, the error associated with the oscillator at the indoor unit may be based on the symbol rate of the signal received at the user terminal. The error associated with the oscillator at the indoor unit may also be based on the frequency and the symbol rate of the signal as transmitted from the gateway. The method also includes computing a transmit frequency correction for the user terminal based at least in part on the error of the oscillator at the outdoor unit and the error of the oscillator at the indoor unit (1010). The method also includes computing a transmit symbol rate correction for the user terminal based at least in part on the error of the oscillator at the indoor unit (1012). In an embodiment, the method may also comprise adjusting a frequency of a transmission from the user terminal based on the transmit frequency correction, and adjusting a symbol rate of a transmission from the user terminal based on the transmit symbol rate correction.

Figure 11:
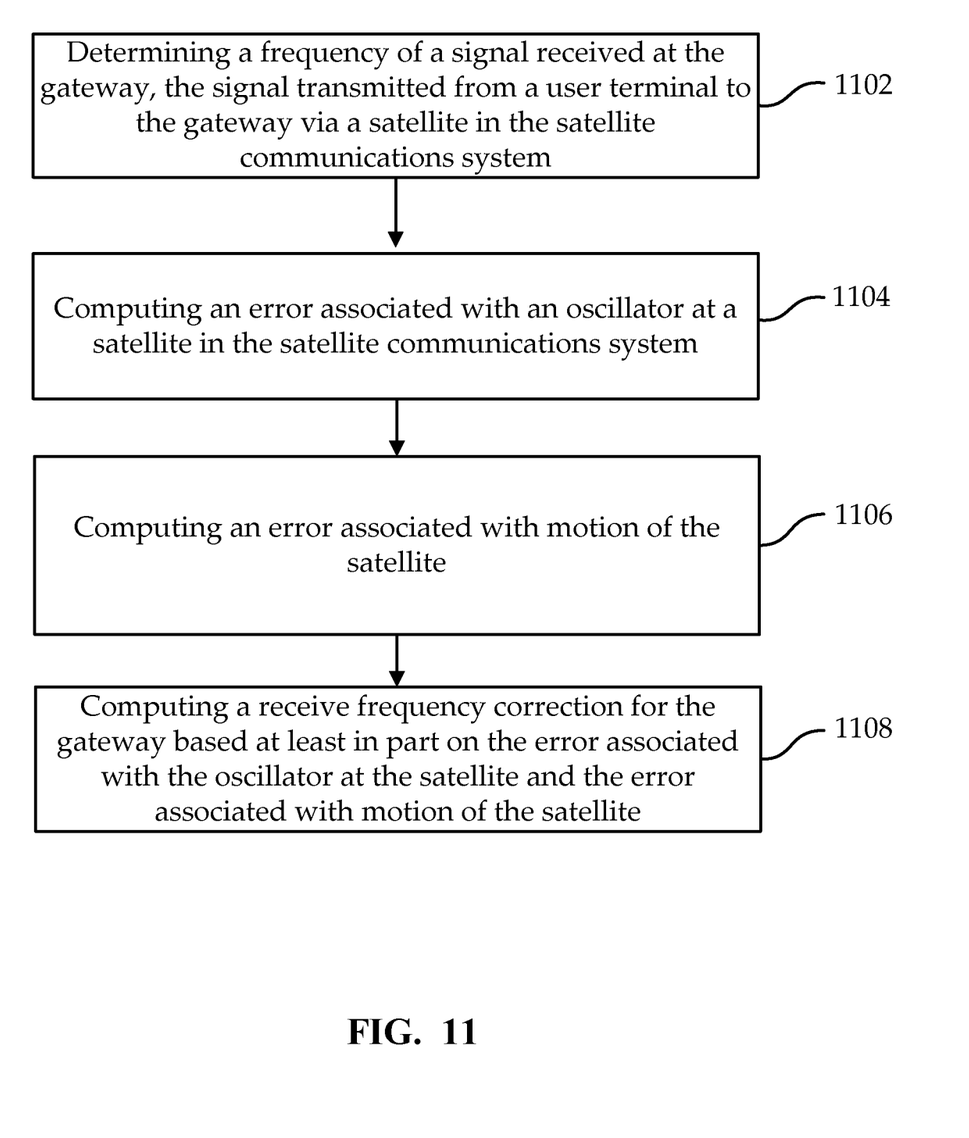
FIG. 11 is a simplified block diagram of an exemplary method for determining a correction for transmissions received at a gateway in a satellite communications system in accordance with an embodiment of the present invention.

FIG. 11 is a simplified flowchart illustrating an exemplary method for determining a correction for transmissions received at a gateway in a satellite communications system in accordance with an embodiment of the present invention. The method includes determining a frequency of a signal received at the gateway, where the signal is transmitted from a user terminal to the gateway via a satellite in the satellite communications system (1102). In an embodiment, determining the frequency of the signal received at the gateway may comprise measuring the frequency of the signal using a demodulator at the gateway. The method also includes computing an error associated with an oscillator at a satellite in the satellite communications system (1104). In an embodiment, the error associated with the oscillator at the satellite may be based on a frequency of an oscillator at the gateway. The method also includes computing an error associated with motion of the satellite (1106). The method also includes computing a receive frequency correction for the gateway based at least in part on the error associated with the oscillator at the satellite and the error associated with motion of the satellite (1108). In an embodiment, the method may also comprise applying the receive frequency correction to a transmission received at the gateway.

It should be appreciated that the specific steps illustrated in FIGS. 10-11 provide particular methods for determining frequency and symbol rate corrections in accordance with embodiments of the present invention. The steps outlined above may be carried out by system software and/or hardware, and in some embodiments the steps may be continuously repeated. Also, other sequences of steps may be performed according to alternative embodiments. For example, the steps outlined above may be performed in a different order. Moreover, the individual steps illustrated in FIGS. 10-11 may include multiple sub-steps that may be performed in various sequences as appropriate to the individual step. Furthermore, additional steps may be added or removed depending on the particular application. One of ordinary skill in the art would recognize many variations, modifications, and alternatives.

It should be noted that the methods and systems discussed throughout the specification are provided merely as examples. Various embodiments may omit, substitute, or add various procedures or components as appropriate. For instance, it should be appreciated that features described with respect to certain embodiments may be combined in various other embodiments. Also, measurements can be made and the various values provided in any units. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for determining frequency and symbol rate corrections for transmissions in a satellite communications system, the method comprising:
 determining a frequency correction and a symbol rate correction for transmissions from a user terminal by:
  determining a frequency of a signal received at the user terminal, the signal transmitted from a gateway to the user terminal via a satellite in the satellite communications system;
  determining a symbol rate of the signal received at the user terminal;
  computing an error associated with an oscillator at an outdoor unit of the user terminal based at least in part on the frequency of the signal received at the user terminal;

computing an error associated with an oscillator at an indoor unit of the user terminal based at least in part on the frequency of the signal received at the user terminal;

computing a transmit frequency correction for the user terminal based at least in part on the error of the oscillator at the outdoor unit and the error of the oscillator at the indoor unit; and computing a transmit symbol rate correction for the user terminal based at least in part on the error of the oscillator at the indoor unit;

determining a correction for transmissions received at the gateway by:

determining a frequency of a signal received at the gateway, the signal transmitted from the user terminal to the gateway via the satellite;

computing an error associated with an oscillator at the satellite and motion of the satellite based at least in part on the frequency of the signal received at the gateway, the signal transmitted from the user terminal to the gateway via the satellite; and computing a receive frequency correction for the gateway based at least in part on the error associated with the oscillator at the satellite and the motion of the satellite.

2. The method of claim 1 further comprising adjusting a frequency of a transmission from the user terminal based on the transmit frequency correction.

3. The method of claim 1 further comprising adjusting a symbol rate of a transmission from the user terminal based on the transmit symbol rate correction.

4. The method of claim 1 wherein determining the frequency of the signal received at the user terminal comprises measuring the frequency of the signal using a demodulator at the user terminal.

5. The method of claim 1 wherein the error associated with the oscillator at the indoor unit is based on the symbol rate of the signal received at the user terminal.

6. The method of claim 1 wherein the error associated with the oscillator at the outdoor unit is based on the frequency of the signal as transmitted from the gateway.

7. The method of claim 1 wherein the error associated with the oscillator at the indoor unit is based on the frequency and the symbol rate of the signal as transmitted from the gateway.

8. The method of claim 1 further comprising applying the receive frequency correction to a transmission received at the gateway.

9. The method of claim 1 further comprising:

determining a symbol rate of the signal received at the gateway, and computing a receive symbol rate correction for the gateway based at least in part on the error associated with the motion of the satellite.

10. The method of claim 9 further comprising applying the receive symbol rate correction to a transmission received at the gateway.

11. The method of claim 1 wherein determining the frequency of the signal received at the gateway comprises measuring the frequency of the signal using a demodulator at the gateway.

12. The method of claim 1 wherein the error associated with the oscillator at the satellite is based on a frequency of an oscillator at the gateway.

13. A system for determining frequency corrections and symbol rate corrections for transmissions in a satellite communications system, comprising:

a gateway;

a satellite communicatively coupled to the gateway; and at least one user terminal communicatively coupled to the satellite, wherein each user terminal is configured to:

determine a frequency of a signal received at the user terminal, the signal received at the user terminal being transmitted from the gateway to the user terminal via the satellite;

determine a symbol rate of the signal received at the user terminal;

compute an error associated with an oscillator at an outdoor unit of the user terminal based at least in part on the frequency of the signal received at the user terminal;

compute an error associated with an oscillator at an indoor unit of the user terminal based at least in part on the frequency of the signal received at the user terminal;

compute a transmit frequency correction for the user terminal based at least in part on the error of the oscillator at the outdoor unit and the error of the oscillator at the indoor unit; and compute a transmit symbol rate correction for the user terminal based at least in part on the error of the oscillator at the indoor unit;

and wherein the gateway is configured to:

determine a frequency of a signal received at the gateway, the signal received at the gateway being transmitted from the user terminal to the gateway via the satellite;

compute an error associated with an oscillator at the satellite and motion of the satellite based at least in part on the frequency of the signal received at the gateway, the signal transmitted from the user terminal to the gateway via the satellite; and compute a receive frequency correction for the gateway based at least in part on the error associated with the oscillator at the satellite and the error associated with motion of the satellite.

14. The system of claim 13 wherein the user terminal is further configured to adjust a frequency of a transmission from the user terminal based on the transmit frequency correction.

15. The system of claim 13 wherein the gateway is further is configured to apply the receive frequency correction to a transmission received at the gateway.

16. The system of claim 13 wherein the error associated with the oscillator at the outdoor unit is based on the frequency of the signal received at the user terminal.

17. The system of claim 13 wherein the error associated with the oscillator at the indoor unit is based on the frequency and the symbol rate of the signal received at the user terminal.

18. The system of claim 13 wherein the error associated with the oscillator at the satellite is based on a frequency of an oscillator at the gateway.

19. The system of claim 13 wherein the gateway is further configured to determine a symbol rate of the signal received at the gateway, and compute a receive symbol rate correction for the gateway based at least in part on the error associated with the motion of the satellite.

* * * * *